United States Patent

[11] 3,632,885

[72] Inventor Wolf Herold
Ay/Iller, Germany
[21] Appl. No. 869,155
[22] Filed Oct. 24, 1969
[45] Patented Jan. 4, 1972
[73] Assignee Telefunken Patentverwertungsgesellschaft mbH
Ulm am Danube, Germany
[32] Priority Oct. 24, 1968
[33] Germany
[31] P 18 04 870.9

[54] MEANS FOR AUTOMATICALLY SHIFTING CHANNEL ALLOCATIONS BETWEEN INDIVIDUAL STATIONS OF A MULTIPLEX TRANSMISSION SYSTEM
7 Claims, 10 Drawing Figs.

[52] U.S. Cl. .......... 179/15 BA
[51] Int. Cl. .......... H04j 5/00
[50] Field of Search .......... 179/15 BA, 15 BY, 15 BS, 15 BM, 15 M

[56] References Cited
UNITED STATES PATENTS
3,517,312 6/1970 Yamato .......... 325/4

*Primary Examiner*—Ralph D. Blakeslee
*Attorney*—Spencer & Kaye

ABSTRACT: In a multiplex transmission system composed of a plurality of ground stations each normally allocated an equal number of the data channels available in the system, means for determining when all of the channels assigned any given ground station are not being utilized and for permitting other ground stations to utilize those channels.

Inventor:
Wolf Herold
BY Spencer & Kaye
ATTORNEYS.

INVENTOR
Wolf Herold

BY Spencer & Kaye
ATTORNEYS.

INVENTOR
Wolf Herold
BY Spencer & Kaye
ATTORNEYS.

MEANS FOR AUTOMATICALLY SHIFTING CHANNEL ALLOCATIONS BETWEEN INDIVIDUAL STATIONS OF A MULTIPLEX TRANSMISSION SYSTEM

BACKGROUND OF THE INVENTION

The present invention relates to a multiplex system for transmitting binary coded data via a communications satellite.

Multiplex systems are generally characterized in that they have a fixed transmission capacity of C channels divided among $n$ ground stations so that each simultaneously transmitting ground station has available the same number $C/n$ of channels in a given frequency range. The information contents of these channels are transmitted in a time sequence of such a type that the proper sequential order is maintained in the same manner by all ground stations with the aid of synchronizing signals which determine a constant time frame.

A full utilization of the transmission capacity of such a data transmission system is desirable for economic reasons, particularly in very costly systems such as satellite transmission systems. The usual methods employed are multiplexing methods which can be divided into three groups, i.e., time-division multiplex, frequency-division multiplex and time-function multiplex methods. Of these the time and frequency multiplex methods have been in use for a long time.

Time function multiplex methods have been proposed under the names Radas and SSMA. The transmission here occurs by binary coding the information signals with time functions and combining the individual time functions from the various stations into a composite signal. The time functions may consist, for example, of addresses which contain information about the sender and/or receiver and which additionally contain, in the form of polarity variations or by means of amplitude modulation, the actual data. The recognition of the individual data is accomplished by correlating a fixed time function, e.g., the own address of the respective ground station, with the total composite signal.

It is permissible for time shifts to occur at the satellite between the time frames of the individual ground stations.

By setting a constant time frame by the transmission of synchronizing signals and with the aid of the bit timing rate, the number of bits per frame that can be transmitted by one ground station is automatically established. If a certain number of bits is assumed per channel and per frame, the number of channels per time frame for each station is also established. This number of channels $C/n$ is available to each participating ground station.

With a fluctuating data supply at the individual ground stations, it will often happen that individual ground stations can not fully utilize the $C/n$ channels at their disposal, but will use only a fraction thereof $(C/n)^* = K \cdot (C/n)$ where $k < 1$, whereas other ground stations require additional channels but can not meet this requirement because of the fixed channel allocation.

The most economical utilization of the data transmission system is thus not possible.

SUMMARY OF THE INVENTION

It is a primary object of the present invention to eliminate this drawback.

A further object of the invention is to permit a more flexible allocation of channels among the several ground stations. These and other objects according to the invention are achieved by certain improvements in a system for the multiplex transmission of binary coded data between $n$ ground stations, which system has a total capacity of C channels divided equally among the ground stations. Each ground station transmits information from each of its channels in a cyclic sequence, all ground stations transmitting simultaneously with their cyclic sequences in synchronism, and the information in each channel is modulated by a respective binary-coded address word which is repeated during each cyclic sequence. Each ground station detects the information directed to it by correlating all of the transmitted data with its assigned address word. The improvement according to the invention is achieved by means operatively associated with all ground stations for enabling any ground station whose channel capacity is being fully utilized to transmit data over unoccupied channels normally assigned to another ground station, which data is modulated by a special address.

DESCRIPTION OF THE PREFERRED EMBODIMENTS

Figure 1A:
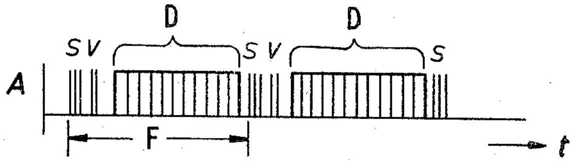
FIGS. 1 are signal diagrams used in explaining the principles of the present invention.
Figure 1B:
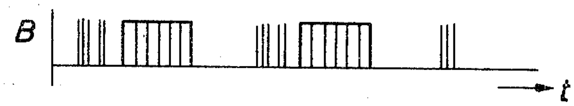
Figure 1C:
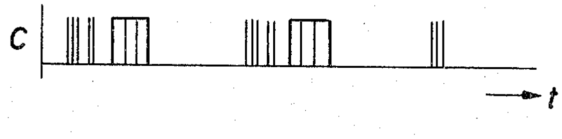

FIGS. 1*a*, 1*b* and 1*c* show schematic representations of the channel usage by three ground stations A, B and C respectively. Control signals V are emitted after synchronizing signals S, and thereafter the data D for the associated channels is transmitted. For reasons of simplicity it shall be assumed that one bit is transmitted per channel and per clock pulse.

During each time frame F, each station transmits, in succession, a data sample signal for each of its channels then in use. The resulting signals from all stations are transmitted simultaneously and combined, e.g., at the satellite, into the composite signal received by all ground stations. Thus, each station transmits signals associates with its respective channels in sequence, and all stations transmit their resulting signals simultaneously.

While ground station A fully utilizes its channel capacity, ground stations B and C do not use their transmission capacity to the fullest extent. According to the present invention, ground station A is permitted to employ such gaps in the transmission from other ground stations for its own transmission channels. In an advantageous further development of the present invention the assignment of such gaps to the individual ground stations is accomplished by a master station acting as a central office in order to avoid double occupancies which could appear if each individual ground station were to take up a free channel at will. The data which are thus transmitted in "foreign" channels, must be specially marked. The individual ground station occupying such a channel is already transmitting during the total time period of the time frame so that the data transmission over the foreign channels coincides in time with the data transmission in its own channels. Since a separation of the individual data is accomplished only by means of the addresses, a special identification for the addresses transmitted in the "foreign" channels is necessary.

The required special identification of these addresses becomes particularly easy when the high frequency carrier for the data intended for foreign channels is in phase quadrature with the high frequency carrier of the normally transmitted data. The prerequisite for phase quadrature can be accomplished particularly easily by a shift by 90° of a sine function so that it now becomes a cosine function.

FIG. 1 shows the case where, due to rigid relationships between time frame, bit timing and number of channels, unoccupied channels may appear at the end of a time frame.

Figure 2A:
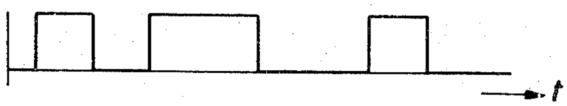
FIGS 2 are waveform diagrams used in explaining the operation of embodiments of the invention.
Figure 2B:
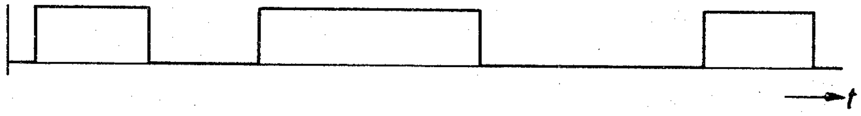
Figure 2C:
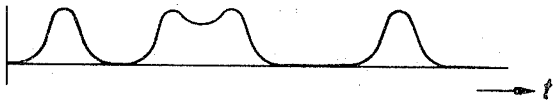

An advantageous further development of the present invention is based on the fact that the binary coded signals do not appear in the form of the rectangular pulses shown in FIG. 2*a* but that rather an approximation of a cosine-squared wave is transmitted for each bit, as shown in FIG. 2*c*.

Figure 2D:
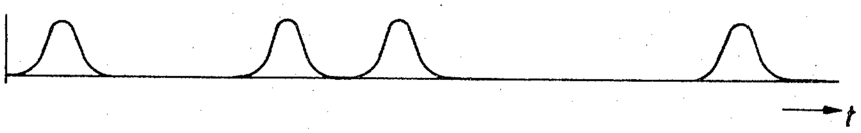

In an advantageous manner, each ground station performs a continuous monitoring to determine if all its channels are occupied. If this is not the case, it reduces its bit timing rate by the appropriate factor. FIG. 2*b* shows this for the case where exactly half of the channels are not occupied ($k$=0.5). The bit timing rate is then also cut in half, i.e., each bit has twice the length it had in its previous state. Insofar as concerns the actual bell-shaped pulses, the time function according to FIG. 2*c* is now changed to a time function according to FIG. 2*d*. It can be seen that there are gaps between the individual positive bell-shaped pulses which may be occupied, in the sense of the present invention, by other ground stations.

Another advantageous embodiment of the present invention is based on the fact that the appearance of possibly very small gaps may lead to difficulties in the assignment of these gaps to "foreign" ground stations. The data which is to be transmitted by the not fully utilized station as well as that data which the fully occupied station wishes to transmit over additional channels is thus placed into an intermediate store. The intermediate storage of the data from the not fully utilized station is accomplished over so many time frames until the gaps have added up to a full time frame. This complete time frame is now assigned to one or more other stations which wish to utilize "foreign" channels.

The participation of a plurality of ground stations in the data transmission by means of the system according to the present invention raises the problem of exact synchronization of all stations, which is very difficult to realize in practice. In reality it will happen that due to minimal frequency differences between the individual stations, there appear slight time shifts in the channels of the individual stations with respect to one another. Since, according to the method of the present invention, the gaps defined by the position of these channels with respect to time are to be filled, these slight time shifts might lead, under certain circumstances, to overlaps at the edges of the gaps. It is therefore advisable that each ground station occupying foreign channels maintain, during this occupancy, the bit timing of that ground station to which these channels actually belong in order to prevent these overlaps from exceeding a permissible value. When the data are transmitted through the utilization of intermediate storage, this difficulty is avoided.

Figure 4:
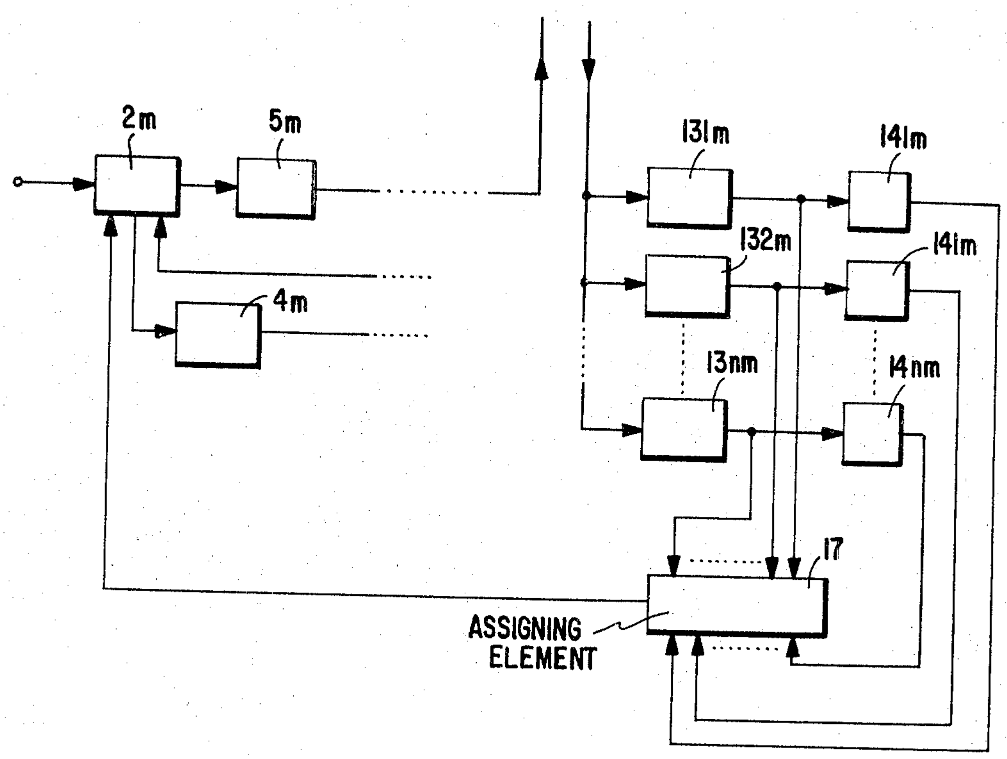
FIG. 4 is a block diagram of a master station.
Figure 5:
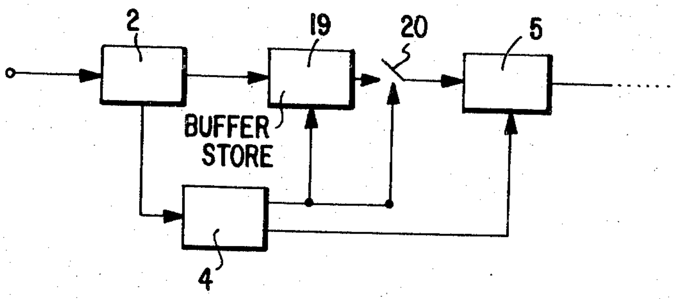
FIG. 5 shows a modification of some parts of the block diagram accorded to the ground station. The control signals V shown in FIGS. 1 are the signals which usually establish communication in PCM-systems.
Figure 3:
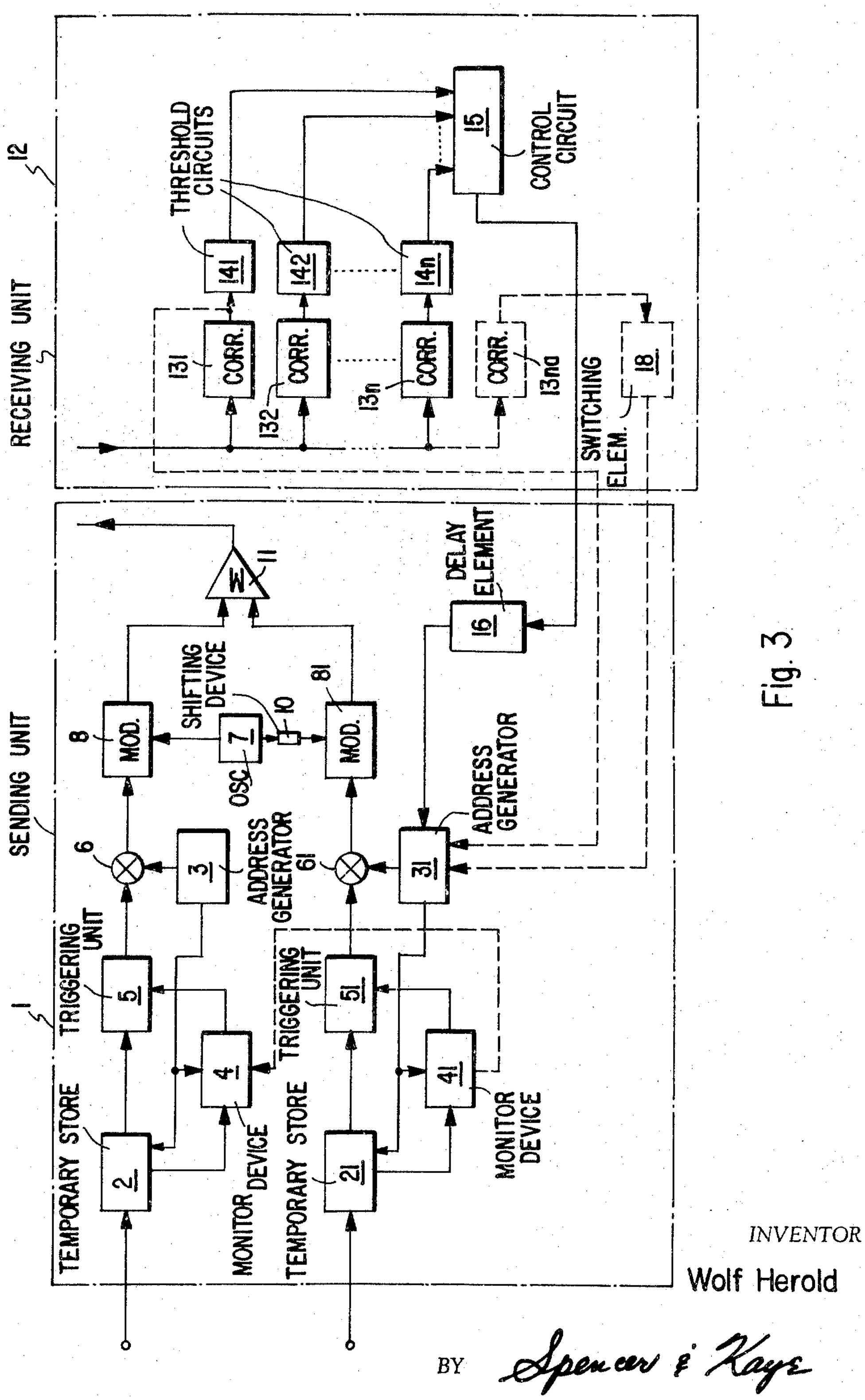
FIG. 3 is a block diagram of a ground station.

Two examples of advantages embodiments of the present invention will be described now as they are shown in FIGS. 3–5.

FIG. 3 shows a ground station operating according to the first mentioned function, i.e., the ground station detects gaps within the transmitted data and utilizes these gaps at will for its own transmission channels.

The data to be transmitted are delivered by a PCM-system to the input of the sending part 1 of the ground station. Within the sending part 1, the data are given to a first temporary store 2, which can be, e.g., a shift register. The information is shifted through the store 2 by a clock pulse which is generated by an address generator 3. The latter is a feedback-shift register which is controlled by a clock pulse generator, whose output is suitably divided before being delivered to the temporary store 2. A suitable feedback-shift register is described, e.g., in W. W. Peterson, Prufbare und Korrigierbare Codes, Oldenbourg-Verlag, 1967, S. 151.

The data flow through the temporary store is monitored by a monitor device 4. The monitor device 4 is built up as a storage unit, advantageously a core memory. The function of the monitor device 4 is to check for each channel, whether there are signals for establishing or disconnecting communication within the control signals V. In this way, an information about the utilization of all channels is gained which is undependent of the transmitted information (which can be a sequence of zeros at time). The monitor device 4 is read out by use of the same clock pulse as the temporary store 2. The output of the temporary store 2 is connected to a triggering unit 5. Controlled by the contents of monitor device 4, the triggering unit 5 changes the data (1, 0) into (+1, −1), respectively; in case of not utilized channels, it delivers zeros. The sequence of (+1, −1) bits is multiplied by the addresses generated by address generator 3 (multiplicator 6). The output signals of multiplicator 6 modulate a carrier generated by an oscillator 7 (modulator 7) and then are transmitted. In case of overflow, the data exceeding the given capacity of the ground station are conducted to an overflow line. This separation of data is effected by the PCM-system itself which is to be imagined as being provided before the ground station. This kind of separation in PCM-systems is well know and usual.

The exceeding data are handled in the same manner as the first-mentioned data, i.e., devices 21–81 are provided, the functions of which correspond to those of devices 2–8. For accomplishing the prerequisite for phase quadrature of the carrier, as above mentioned, the sine function generated by oscillator 7, is shifted by 90° in a shifting device 10 connecting oscillator 7 and modulator 81.

The modulators 8 and 81 are connected to a summing network 11 combining all signals before they are transmitted. The receiving part 12 of the ground station consists of correlators 131, 132 ... **13*n*, where $n+1$ is the number of ground stations. The correlators are built up as described, e.g., in H. Blasbalg, IEEE Trans., Vol. AES 4, no. 5 Sept. 68, p. 774. Each one of them is tuned to the address of one ground station except the ground station shown here. The correlators therefore deliver signals which are equal zero when some of the channels are not utilized, and unequal to zero in case of utilization. The signals are checked by threshold value circuits 141 ... 14*n*. In any case one of the threshold value circuits finds a channel free, a corresponding signal is given to a control circuit 15. This control circuit 14 can be, e.g., a rotating switch checking one threshold value circuit after the other and controlling the second address generator 31 dependent on the output signal of the threshold value circuit. Between the control circuit 15 and the address generator 31, a delay element 16** is provided for compensating the different delay times between the ground stations and the satellite.

In this case, each ground station takes up "foreign" channels at will. As above mentioned, an advantageous development of the present invention provides a "master station" which operates as a central office. FIG. 3 shows the necessary modifications in dashed lines.

The monitor device 41 of the ground station signalizes the overflow of information which fills the temporary store 21, to the monitor device 2 thus effecting that within the control signals V a specific signal is transmitted which indicates the fact of overflow to the master station.

The master station is built up similar to the ground station (FIG. 4). In this context, all equal parts of the embodiment according to FIG. 3 are marked by an annexed *m*. When checking all output signals of the correlators **131*m* ... 13*nm***, the master stations "sees" the ground stations signalizing overflow. The master station has its own transmitting period within the frame. Within the control signal V*m* of this period, informations are transmitted to the ground stations concerning the assignment of gaps to the individual stations. This information is derived by an assigning element 17 from the output signals of the correlators **131*m* ... 13*nm* (address of the "overflowing" ground station) and of the threshold value circuits 141*m* ... 141*nm*** indicating the gaps, the addresses of the gaps are given by the correlators, again. The assigning element influences the control signals V*m* by controlling the temporary store **2*m*. The assigning element 17 is a switch which operates according to a given strategy. The ground station has an additional correlator 131*na*** tuned to the addresses of the master station. So the control signals V*m* are evaluated, and a switching element 18 provides the address generator 31 to operate at the fitting times. The correct synchronization is reached by deriving the bit timing from the output signals of that correlator which is assigned to the ground station channels of which are to be occupied (here 131).

FIG. 5 shows a modification of the input stages of FIG. 3 by which the data are stored intermediately until the gaps have added up to a full time frame. The temporary store 2 is connected to a buffer store 19. If the monitor device 4 finds out that there are gaps in the data flow through the store 2, it opens a switch 20 for a frame's time. So a whole frame is not utilized. After closing the switch 20, the buffer store is read out. Because of the gaps, the buffer store is empty some frames later; so a new full frame is not utilized (until the buffer store is filled again). At the end of the "empty" gap, and "overframe" signal can be transmitted, as it is well known in PCM-technique.

It will be understood that the above description of the present invention is susceptible to various modifications, changes and adaptations.

What is claimed is:

1. In a system for the multiplex transmission of binary-coded data between $n$ ground stations, which system has a total capacity of C channels divided equally among the ground stations, each ground station transmitting information from each of its channels in a cyclic sequence, all ground stations transmitting simultaneously with their cyclic sequences in synchronism, the information in each channel being modulated by a respective binary-coded address word which is repeated during each cyclic sequence, and each ground station detecting the information directed to it by correlating all of the transmitted data with its assigned address word, the improvement comprising means operatively associated with all ground stations for enabling any ground station whose channel capacity is being fully utilized to transmit data over unoccupied channels normally assigned to another ground station, which data is modulated by a special address.

2. An arrangement as defined in claim 1 wherein each ground station that utilizes only a fraction $k$ of its available number of channels $C/n$; where $k<1$, reduces the bit timing rate of its address words by $k$ and wherein all ground stations which utilize one of the unused channels also reduce the bit timing rate of the associated address words by $k$ and transmit those words in the signal gaps between the address words of the first-mentioned ground station.

3. An arrangement as defined in claim 1 wherein each ground station which utilizes only a fraction $k$ of the available number of channels $C/n$, employs an intermediate storage and transmits data without interruption for $k/1-k)$ times frames and leaves the subsequent time frame unoccupied, and wherein this subsequent empty time frame is occupied by other ground stations wishing to utilize it for previously stored data transmissions.

4. An arrangement as defined in claim 1 further comprising a master station acting as a central office for assigning the unoccupied channels of one ground station to other ground stations.

5. An arrangement as defined in claim 1 wherein the special address is produced as a time function in phase quadrature to the original address.

6. An arrangement as defined in claim 1 wherein each ground station which occupies unoccupied channels of another ground station synchronizes the signals involved with the bit timing of the other ground station.

7. An arrangement as defined in claim 1 wherein a plurality of ground stations can occupy the unoccupied channels of another ground station and one ground station can occupy the unoccupied channels of a plurality of other ground stations.

* * * * *